May 10, 1955  E. BURHOP  2,708,071
MIXING VALVE
Filed July 15, 1952  2 Sheets-Sheet 1
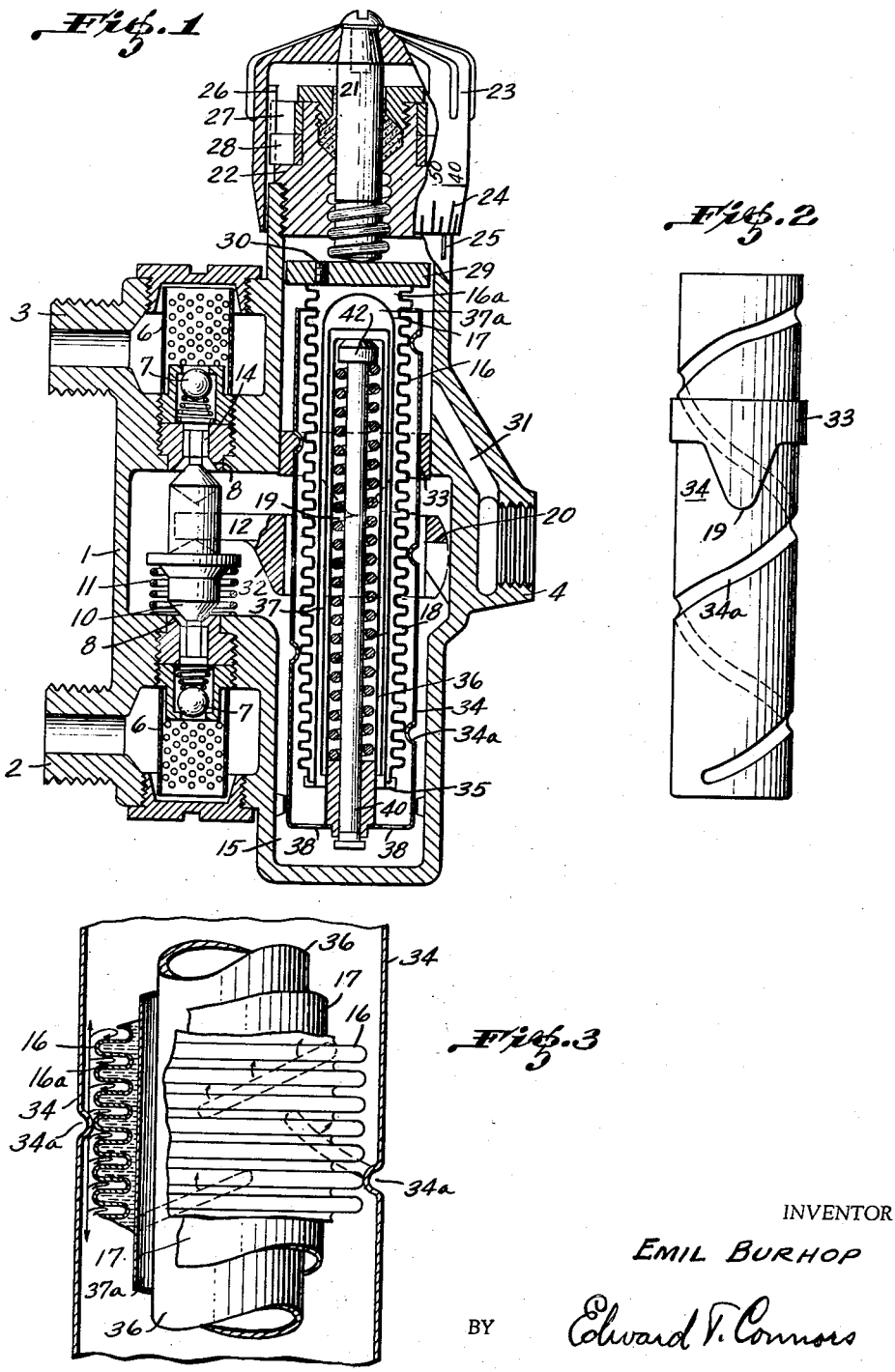
INVENTOR
EMIL BURHOP
BY Edward V. Connors
ATTORNEY May 10, 1955  E. BURHOP  2,708,071
MIXING VALVE
Filed July 15, 1952  2 Sheets-Sheet 2
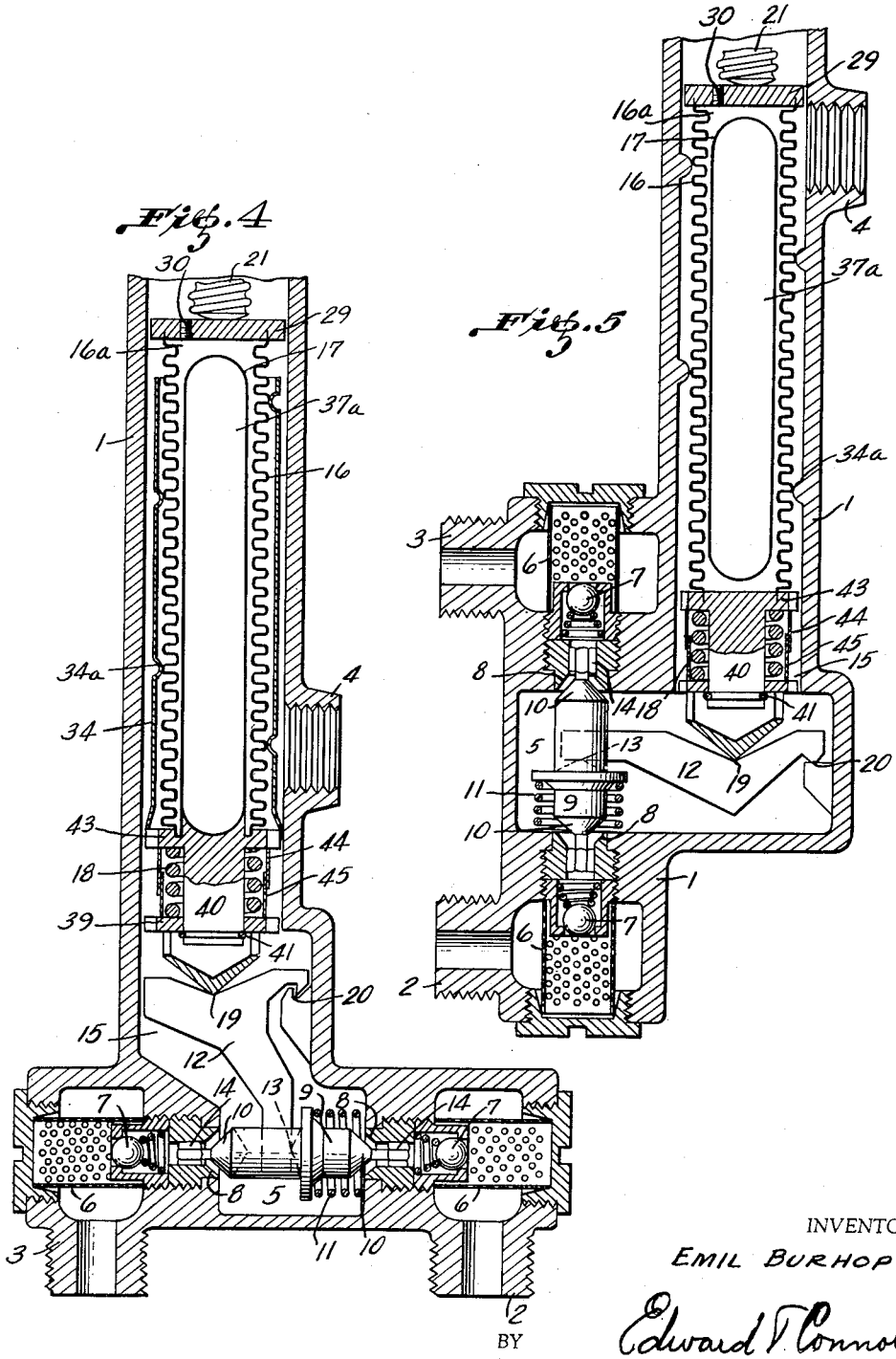
INVENTOR
EMIL BURHOP
BY Edward V. Connors
ATTORNEY

United States Patent Office

2,708,071
Patented May 10, 1955

2,708,071

MIXING VALVE

Emil Burhop, Bern, Switzerland

Application July 15, 1952, Serial No. 298,967

Claims priority, application Germany July 26, 1951

7 Claims. (Cl. 236—12)

This invention relates to mixing valves for warm and cold water with automatic adjustment of the mixed water temperature by means of an axially expansible and contractible hollow ribbed tube containing an expansible medium.

Prior mixing cocks of this kind are disadvantageous in that the ribbed tube is subject to buckling which adversely affects the mixing accuracy. Moreover, the volume of the expansible medium (liquid) is excessively large so that the prior valves react very slowly. Additionally, the mixed water sweeps the ribbed tube only partially and an undesired heat exchange occurs with regard to the expansible medium, reducing the mixing accuracy considerably.

My novel mixing cock is characterised in that the expansible medium is confined in a ribbed tube, the outer surface of which is swept by the water, and by a guiding body contained in said ribbed tube which protects the ribbed tube from buckling and serves simultaneously for heat-insulating the expansible medium, thereby providing a quick response valve of exceptional accuracy.

Other objects and features will be apparent as the following description proceeds, reference being had to the accompanying drawings illustrating by way of examples several embodiments of my invention, and wherein:

Fig. 1 is a longitudinal section through the first embodiment of the invention,

Fig. 2 illustrates a tube having deflecting surfaces.

Fig. 3 shows a modified detail on a larger scale.

Fig. 4 is a longitudinal section of a second embodiment of the invention, and

Fig. 5 a longitudinal section of a third embodiment of the invention.

In all of the embodiments illustrated on the drawings the mixing valve comprises the following parts: A casing 1 with a connecting piece 2 for hot water, a connecting piece 3 for cold water, and a connecting piece 4 for the mixed water. The feed conduits for hot and cold water discharge into a mixing chamber 5. Between each connecting piece 2, 3 and the mixing chamber 5 a sieve 6 and a nonreturn valve 7 are provided. The discharge openings of the hot and cold water feed conduits to the mixing chamber 5 are each controllable by a cone valve. These discharge openings with conical seats 8 lie in the chamber 5 coaxially to each other. An axially movable valve body 9 is provided between the two seats 8 and has conical end faces 10 corresponding to the seats 8. The valve body 9 is under the influence of a spring 11 and under the influence of a control lever 12, the one end of which is supported on a knife edge 13 of the valve body 9. The valve body 9 is guided in the bores of the valve seats 8 by means of slides 14.

The mixing chamber 5 communicates with a chamber 15 comprising a thermostat acting on the control lever 12, this thermostat being described later on. The chamber 15 lies between the mixing chamber 5 and the discharge means 4 for the mixed water so that the thermostat is contacted by the water leaving the mixing chamber 5.

The thermostat comprises a spring tube 16 with hollow ribs. The spring tube is tightly closed at both ends and comprises a filling body with a sleeve 17. The space formed between the members 16 and 17 is small, and in consequence, the quantity of expansible medium 16a (such as ether or benzene for instance) contained therein is also small. The outer surface of the sleeve 17 is such a small distance from the tube 16 that the space containing the expansible medium is almost entirely constituted by the hollow ribs of the tube 16. The small medium quantity responds very quickly to changes in temperature of the mixed water sweeping the outer surface of the ribbed tube 16. Owing to this small distance, the sleeve 17 also prevents any bending or buckling of the ribbed tube 16.

The ribbed tube 16 is supported on the control lever 12 by means of bearing edges 19 and under the constraint of an initially tensioned spring 18, the purpose of which will be later explained. The contact lever 12 is swingingly supported on the casing as at 20. Furthermore, the ribbed tube 16 is under the influence of a spindle 21 acting against the spring 18. As shown in Fig. 1, tthe spindle 21 is screwed into a nut 22 rigidly connected with the casing 1. The spindle 21 is rigidly connected with a control knob 23 having a temperature scale 24 adjustable with regard to a stationary mark 25 of the casing 1. As shown in the drawings, in all the three examples the lengths of the arms of lever 12 are unequal so that the movements transmitted from the ribbed tube 16 to the valve body 9 are increased.

The control knob 23 has an inner projection 26 movable between two adjustable stops 27 and 28 of the nut 22, acting to limit the rotation of the control knob 23.

The closing piece 29 fixed to one end of the ribbed tube 16 has a filling hole closable by a screw 30.

In the example of Fig. 1 the chamber 15 is connected with the discharge opening 4 by a channel 31.

Between its supports 13 and 20 the lever 12 comprises an annular portion 32 which is traversed by the ribbed tube 16 and comprises two cut-outs receiving the bearing edges 19. These edges 19 are provided on a ring 33 fixed to a tube 34 surrounding the ribbed tube 16. The one end of the ribbed tube 16 is rigidly and tightly fixed to the sleeve 17 of the filling body as at 35. The sleeve 17 may for instance consist of metal and may be round or shaped in any other way. Into sleeve 17 a second sleeve 36 of the filling body is inserted, the one end of this second sleeve being likewise tightly connected with the ribbed tube 16.

Sleeves 17 and 36 form together a space 37a closed from all sides, which, for heat insulating purposes, may either be vacuous or contain gaseous or solid filling substances. This space may, for instance, be replaced by glass or plastics or any other heat insulating material.

A heat insulating tubular piece 37 is inserted between the sleeves 17 and 36, reducing heat exchange by radiation between the sleeves 17 and 36. Due to the insulating space 37a the expansible medium 16a neither gives out heat towards the interior of the filling body nor does it absorb heat from said interior. Therefore, any effect on the mixing accuracy by such a heat exchange is avoided.

At its lower end, the tube 34 has openings 38 for the passage of water and carries a sliding bearing 39 for a rod 40. The one end of the rod 40, projecting beyond the bearing 39, carries a spring ring 41, and the other end a head 42. Between head 42 and bearing 39 the initially tensioned spring 18 is inserted coaxially to the ribbed tube 16.

The tube 34 has a helical deflecting surface 34a extending over the whole height of the inner surface of the tube 34. The ribs of the tube 16 contact the deflecting surface 34. The mixed water entering the openings 38 is forced by the surface 34a to sweep the outer surface of the ribbed tube 16 across its longitudinal axis, so that no dead water can accumulate between adjacent ribs of the tube 16 and, therefore, cannot decrease heat exchange between the expansible medium 16a and the mixed water and cannot affect the mixing accuracy.

The operation of the embodiment of Fig. 1 is as follows:

By turning the control knob 23 the desired temperature of the mixed water is adjusted. By this rotation of the control knob 23 the thermostat is brought into the corresponding adjusting position, that is, the control lever 12, under the influence of the parts 21, 29, 16, 36, 42, 18, 39, 34, 33, rotates about its point of rotation 29 and moves the valve body 9, in order to adjust the mixing ratio of the incoming cold and hot water in correspondence with the adjusted temperature. From the mixing chamber 5, the mixed water flows into the chamber 15 and from here through the openings 38 into the tube 34 where it comes into contact with the ribbed tube 16 and is led by the deflecting surface 34a in a helical path to the upper end of the tube 16. Since the free intermediate space between the tube 34 and the ribbed tube 16 is relatively small, the water flows through this space at a relatively high speed, so that violent whirls occur between the ribs of the tube 16, causing vibration of the ribbed tube 16. This vibration aids the above-mentioned effect of the deflecting surface 34a, so that the water held between the ribs by capillary action is carried away and fresh mixed water transmits continuously its changing temperature to the ribbed tube 16 and to the expansible medium 16a which is likewise put into motion by the vibration of the ribbed tube 16. The quantity of expansible liquid 16a between the ribbed tube 16 and the tube 17 of the filling body being relatively small, its temperature is quickly and completely adapted to the instantaneous temperature of the mixed water sweeping the tube 16. With the temperature, also the volume of the expansible medium 16a is changed. Thereby, the length of the expansible and retractible tube 16 changes and this alteration is transmitted to the valve body 9 in the following manner:

Assuming that the temperature of the water between the parts 16 and 34 rises above the temperature (43° centigrade, for instance) adjusted by means of the control knob 23. The expansible medium 16a expands and increases the spring tube 16 in length. The tube 16 pushes the bearing 39 towards the outside (towards the bottom in Fig. 1) by the intermediary of the parts 36, 42 and 18. The tube 34 is taken along by the bearing 39 and swings the lever 12 in the anticlockwise direction of Fig. 1 by means of the ring 33 with the edges 19. Thereby, the valve body 9 decreases the supply of hot water and maintains the adjusted temperature of the mixed water.

If the temperature of the mixed water flowing through the space between the parts 16 and 34 drops beneath the adjusted value, the medium 16a and with it the ribbed spring tube 16 contract and the tube 34 with the bearing 39, the spring 18 and the head 42 follow this movement under the influence of the spring 11. The lever 12 is swung in the clockwise direction in Fig. 1 and the valve body 9 is moved towards the discharge opening for cold water, whereby the adjusted temperature of the mixed water is maintained. From the tube 34 the water flows through the channel 31 to the discharge opening 4.

During normal operation of the mixing valve as above described the spring 18 positioned between the head 42 and the bearing 39 is effective only to maintain the bearing 39 in its end position abutting against the spring ring 41 engaged with the rod 40 so that the controlling movements of the ribbed tube 16 are transmitted to the control valve body 9. However, when a rapid and substantial change from a high to a low temperature of the mixed water is desired, for instance, from 50° C. to 20° C., the control knob 23 may be suddenly turned from its position corresponding to the higher mixing temperature to its position corersponding to the lower mixing temperature. The ribbed tube 16 is rapidly pushed downwardly by pressure on its upper end without having assumed its new shorter length corresponding to the lower temperature that was selected by the control knob 23. With a rigid transmission gear between the lower end of the ribbed tube 16 and the control valve body 9 this movement would be forcibly transmitted and the valve body 9 might abut against the lower valve seat 8 before the adjusting movement is completed as the length of the ribbed tube still corresponds to the higher temperature of the mixed water. Accordingly, the ribbed tube or other parts of the mixing cock might be severely stressed and possibly be damaged. This difficulty is overcome by the provision of the spring 18 which is compressed under such conditions until the ribbed tube 16 has assumed its length corresponding to the lower temperature. The spring 18 therefore constitutes a part of a resilient transmission gear between the ribbed tube 16 and the control valve 9.

The embodiment shown in Fig. 4 differs from the embodiment of Fig. 1 only by the feature that the balance spring 18 coaxial to the ribbed tube 16 lies outside the thermostat and is supported on a flange 43 which is rigidly connected with the filling body 17 and carries the tube 34. The interior of the body 17, closed from all sides, contains, for instance, air and is thus heat-insulating. The piece 43 carries the rod 40 on which the bearing 39 for the other end of the spring 18 slides. On the lower end of the rod 40 a spring ring 41 is provided. The piece 43 also comprises the supporting edge 19 acting on the lever 12. As may be seen from the drawing, the lever 12 has three arms. However, it works exactly in the same manner as the lever 12 of Fig. 1.

The spring 18 is protected from direct contact with the mixed water by telescopically arranged tubular pieces 44, 45 fixed to the piece 43 and to the bearing 39 respectively.

The operation of the embodiment of Fig. 4 is exactly the same as that of the embodiment of Fig. 1.

The device shown in Fig. 5 differs from the two preceding embodiments only in that the tube 34 is omitted, because the casing 1 is narrow in reach of the ribbed tube 16 and the discharge opening 4 is arranged at its upper end. The helical deflecting surface 34a is directly provided on the inner wall of this narrow portion of the casing 1. Furthermore, the filling body 17 constitutes a hollow body closed at both ends. Its interior may, for instance, contain air.

In the embodiments of Figs. 4 and 5 the filling body may be vacuous or may contain gaseous or solid filling substances or consist of glass or plastics or any other material. When it consists of such material it may be solid or have a hollow core or an axial hollow space open towards the top.

The filling body 17 may either have a round or polygonal or star-shaped cross-section or may have a round cross section and be provided with longitudinal ribs.

The embodiment shown in Fig. 3 only differs from the hitherto described embodiments in that several deflecting surfaces 34a, extending on a portion only of the height of the tube 16, are substituted for the single deflecting surface 34a of Fig. 2 extending all over the height of tube 16. The arrows shown in Fig. 3 and lying between the ribs of the tube 16 illustrate the above-mentioned effect of the deflecting surface or surfaces 34a.

There may also be only one single deflecting surface extending only on a portion of the height of the guide tube 34. However, there may also be several deflecting surfaces parallel to one another or one or more zigzag-shaped deflecting surfaces.

While I have shown and described several embodiments

What I claim is:

1. In a mixing valve for warm and cold water, a warm water inlet, a cold water inlet, a mixing valve member operable between the warm and cold water inlets to admit mixed water, an axially expansible hollow ribbed tube containing an expansible medium responsive to temperature changes of the mixed water, a guiding body for the ribbed tube and including two walls providing a heat insulating space therebetween, a coil spring positioned within the guiding body, the guiding body positioned within and extending through practically the entire length of the ribbed tube, the guiding body being attached at one end of the ribbed tube, the other end of the guiding body being operative against one end of the coil spring, a water passage tube with a deflecting inner surface enclosing the said ribbed tube forming therewith a narrow passage for the mixed water, a lever pivoted at one end and attached to the mixing valve member at the other end for controlling the same, the one end of the water passage tube being in operative engagement with the other end of the said coil spring and the water passage tube at a point between its ends in operative engagement with the said lever for transmitting motion from the ribbed tube to the mixing valve member, and adjustable means for axially displacing the ribbed tube.

2. In a mixing valve for warm and cold water, a warm water inlet, a cold water inlet, a mixing valve member operable between the warm and cold water inlets to admit mixed water, an axially expansible ribbed tube containing an expansible medium responsive to temperature changes of the mixed water, a guiding body for the ribbed tube and including two walls providing a heat insulating space therebetween, a resilient transmission gear, the said guiding body positioned within and extending through practically the entire length of the ribbed tube and attached at one end of the ribbed tube, the other end of the guiding body being operatively engaged with one end of the resilient transmission gear the other end of the resilient transmission being operatively engaged with the mixing valve member for controlling the same responsive to temperature changes of the mixed water, a water passage tube with a deflecting inner surface enclosing the said ribbed tube forming therewith a narrow passage for the mixed water, and adjustable means operatively engaged with the other end of the ribbed tube for adjustment of the axial position of the ribbed tube.

3. In a mixing valve for warm and cold water, a warm water inlet, a cold water inlet, a mixing valve member operable between the warm and cold water inlets to admit mixed water, an axially expansible ribbed tube containing an expansible medium responsive to temperature changes of the mixed water, a guiding body for the ribbed tube positioned within and extending through practically the entire length of the ribbed tube, a resilient transmission gear being operatively connected to one end of the ribbed tube and to the mixing valve member for controlling the mixing valve in response to the axial extension of the ribbed water passage tube, a tube with a deflecting inner surface enclosing the ribbed tube forming therewith a narrow passage for the mixed water, and adjustable means operative against the other end of the ribbed tube for adjustment of the axial position of the ribbed tube.

4. In a mixing valve for warm and cold water, a warm water inlet, a cold water inlet, a mixing valve member operable between the warm and cold water inlets to admit mixed water, an axially expansible ribbed tube containing an expansible medium responsive to temperature changes of the mixed water, control means interposed between one end of the said ribbed tube and the said mixing valve member, a guiding body positioned within the ribbed tube and extending through practically the entire length thereof and including means providing at least one heat insulating space adjacent its outer wall containing a heat insulating medium of low heat capacity, a cylindrical surface enclosing the ribbed tube and forming therewith a narrow passage for the mixed water, and means for axial adjustment of the position of the other end of the said ribbed tube.

5. A mixing valve for warm and cold water providing automatic adjustment of the mixed water temperature combining an axially expansible and contractible hollow ribbed tube containing an expansible medium responsive to temperature changes of the mixed water, a guiding body for the ribbed tube extending through practically the entire length of the ribbed tube, the guiding body including means providing at least one heat insulating space containing a heat insulating medium of low heat capacity adjacent the wall of its inner surface, and water passage means about the ribbed tube for the mixed water.

6. In a mixing valve for warm and cold water, a warm water inlet, a cold water inlet, means exposed to the mixed water temperature for automatically controlling both the warm water inlet and the cold water inlet thereby keeping the mixing water temperature substantially constant, the said means including an axially expansible and contractible hollow ribbed tube containing an expansible medium responsive to temperature changes of the mixed water, a guiding body positioned within and extending through practically the entire length of the said ribbed tube and including means providing at least one heat insulating space containing a heat insulating medium of low heat capacity, and water passage means for sweeping the ribbed tube by the mixed water.

7. In a mixing valve as claimed in claim 2, the said guiding body including two concentrically arranged walls enclosing the heat insulating space.

References Cited in the file of this patent

UNITED STATES PATENTS

| | | |
|---|---|---|
| 476,374 | Eastman | June 7, 1892 |
| 1,137,921 | Snediker | May 4, 1915 |
| 1,798,192 | Clifford | Mar. 31, 1931 |
| 1,801,094 | Lawler | Apr. 14, 1931 |
| 1,962,214 | Russell | June 12, 1934 |
| 2,205,334 | Barnes | June 18, 1940 |
| 2,534,378 | Schlaich | Dec. 19, 1950 |